3,261,758
NUCLEAR REACTORS
Pierre Edmond Jules Marie Maldague and Louis Henri Joseph Tollet, Brussels, Belgium, assignors, by mesne assignments, to Société anglo-belge Vulcain, Société anonyme, Brussels, Belgium
Filed Feb. 21, 1962, Ser. No. 174,795
Claims priority, application Belgium, Mar. 9, 1961, 601,155
1 Claim. (Cl. 176—76)

This invention relates to nuclear reactors. More particularly it relates to assemblies of fuel elements for nuclear reactors.

The cores of nuclear reactors generally comprise assemblies of fuel elements which are mounted side by side according to a predetermined pattern. The nature of known assemblies of fuel elements is such that the axial insertion of withdrawal of one assembly is interfered with by other assemblies in the core. For instance, during insertion or withdrawal one fuel assembly may "hook" to adjoining fuel assemblies. Also, where adjoining fuel assemblies are in contact over relatively large proportions of their surfaces, such contact creates a drag which impedes axial movement of the fuel assemblies.

Accordingly, it is an object of the present invention to provide an improved type of fuel assembly for use with other like assemblies in the fabrication of a nuclear reactor core. Another object of the invention is to provide a fuel assembly which, when associated with other like assemblies in the core of a nuclear reactor, has a relatively small area of contact with said other assemblies. These and other objects of the invention will be readily apparent to persons skilled in the art upon consideration of the description of the invention which follows.

In accordance with the invention there is provided an assembly of fuel elements for a nuclear reactor which comprises a hollow cylindrical support. Means are also provided for fixing fuel elements to the support in a plurality of rows arranged around the support in a horse-shoe like structure, the external contour of which constitutes four adjacent sides of a hexagon. The terminal fuel elements of the rows in each of the terminal sides of the horse-shoe-like structure are located along two lines forming an angle of 120 degrees, this angle and the angle formed by the two central sides of the hexagon being correspondent.

The invention may be better understood by reference to the accompanying drawings, wherein like parts are identified by like reference numerals throughout the several figures, and in which.

Figure 1:
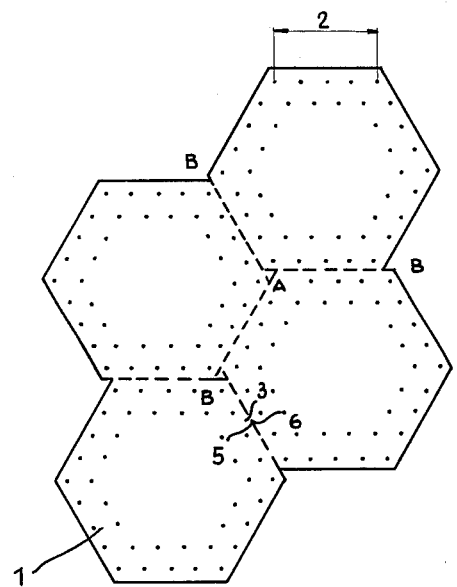
FIGURE 1 is a schematic diagram of prior art fuel assemblies.

In FIGURE 1 are shown four fuel assemblies of hexagonal cross section comprising a plurality of fuel elements 1 distributed in rows 3 along sides 2 of the hexagons. For the sake of simplicity, the fuel elements are designated in this figure by dots, the true shape and manner of making said fuel elements being well known to persons skilled in the art. The surfaces of contact of the fuel assemblies are represented by dashed lines AB. Although each fuel assembly has two rows of fuel elements, four adjacent rows of fuel ements are present where the sides of such fuel assemblies adjoin one another, as indicated at 5–6.

Figure 2:
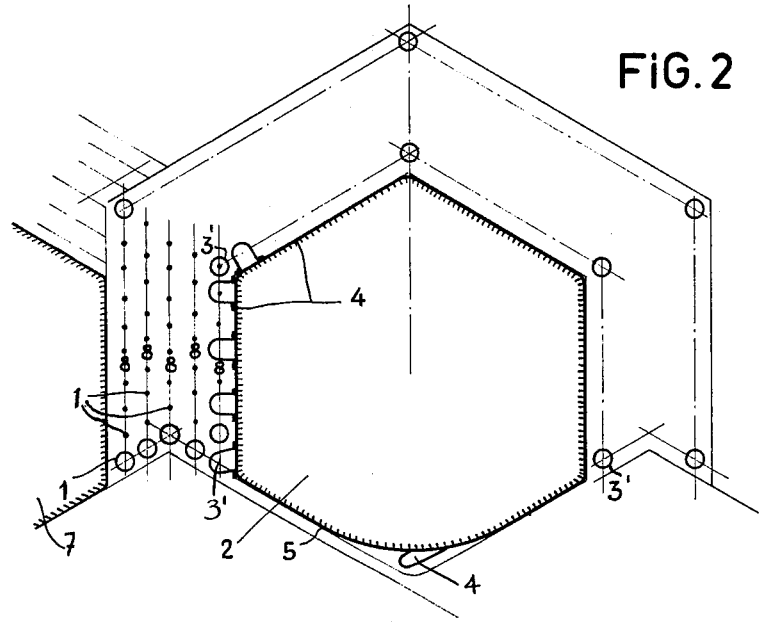
FIGURE 2 is a diagrammatic sectional representation of the fuel assemblies of the present invention.

In contradistinction to the prior art, the specific embodiment of the invention disclosed in FIGURE 2 comprises a fuel assembly having the outline of a hexagon in part only. In the present embodiment, the fuel elements 1 are connected with one another and are arranged around a hollow support 12, which is in the shape of a crown. The arrangement of fuel elements comprises a plurality of rows 8 along each side of the crown or horse-shoe-like structure. The fuel elements of the rows 3' which are nearest the support 12 are secured to a flexible metal band or strap 4. The band 4 forms a belt around the support 12 which tightly secures the crown or horse-shoe-like structure of elements 1 pressed tightly about the support 12. A support 7 similar to the support 12 supports a similar crown or horse-shoe-like structure of fuel elements.

Figure 3:
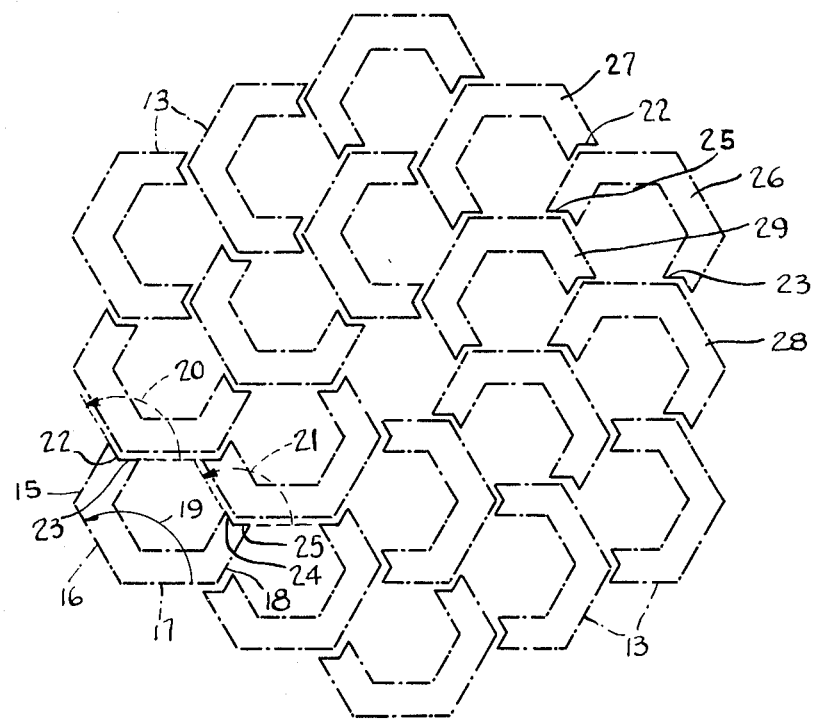
FIGURE 3 is a schematic diagram of a reactor core comprising a plurality of fuel elements having horse-shoe-like structures such as are shown in FIGURE 2.

FIGURE 3 shows diagrammatically the arrangement of a core comprising 18 assemblies of fuel elements having the fuel elements arranged in the crown or horse-shoe-like structure which is characteristic of the embodiment described in FIGURE 2. As may be seen from a consideration of FIGURE 3 while bearing FIGURE 2 in mind, a plurality of fuel assemblies 13, represented by the outlines of the horse-shoe-like structures of fuel elements, are arranged according to a definite pattern. The pattern or manner of arrangement is made possible by the horse-shoe-like structure of the fuel elements in each assembly, the external counter of said horse-shoe-like structure comprising four adjacent sides 15, 16, 17 and 18, of a hexagon, of which 16 and 17 are central sides and 15 and 18 are terminal sides.

The terminal fuel elements in the rows of fuel elements in each horse-shoe-like structure are arranged along lines 22 and 23, which lines form an angle 20 of 120 degrees. There is a similar angle 21 at the other end of each horse-shoe-like structure. The angles 20 and 21 are each correspondent with the angle 19 formed by the two central sides 16 and 17 of the horse-shoe-like structure. The structure just defined facilitates the arrangement of the fuel assemblies in a pattern in which the concave angles 20 and 21 of each assembly are placed adjacent the convex angle formed by two external sides of an adjoining horse-shoe-like structure. Consequently, the area of contact between adjoining fuel assemblies is much smaller than in prior art devices, being limited to the narrow areas in which the aforementioned concave and convex angles fit together.

Among the advantages of the arrangement described above are the small areas of surface contact and the consequent advantage that only two or three of these surfaces will affect the insertion and withdrawal of fuel assemblies from the core. For instance, the dismantling of a core such as that shown in FIGURE 3 may begin with the assembly 26. In such a case it is clear that only three surfaces 22, 25 and 23 may "brake" or frictionally impede the operation.

By proceeding next with the removal of assemblies 27, 28 and 29, and so forth throughout the core, the core comprising a plurality of the above described assemblies may readily be dismantled. This is a significant advantage in that when a reactor core has been in operation for a certain period, the elements in the core are exhausted to different degrees according to the position they have occupied. It is therefore useful to periodically change the positions of the fuel elements so that those which are partially exhausted may be placed in a zone of small activity while those which are less exhausted may be switched to a zone of higher activity. Such a practice will be rendered more efficient and more readily accomplished by an arrangement which, like the present one, minimizes the possibilities for interference between adjacent fuel assemblies in the core during the withdrawal and insertion procedures.

3

It should be understood that the above embodiments have been given by way of example only, and that numerous variations are possible. Therefore, the details described above are to be regarded as exemplary and the invention is to be regarded as embracing all structures which fall within the scope of the appended claim.

What we claim is:

An assembly of fuel elements for a nuclear reactor, comprising a hollow cylindrical support and means for fixing said fuel elements to said support, a plurality of rows of fuel elements arranged around said support in a horse-shoe-like structure, the external contour of which constitutes four adjacent sides of a hexagon, the terminal fuel elements of said rows in each of the terminal sides of said horse-shoe-like structure being located along two lines forming an angle of 120 degrees, said angle and the angle formed by the two central sides of said hexagon being correspondent.

References Cited by the Examiner

UNITED STATES PATENTS

| | | | |
|---|---|---|---|
| 2,806,819 | 9/1957 | Christy et al. | 176—94 X |
| 2,929,768 | 3/1960 | Mahlmeister et al. | 204—193.2-34 |
| 2,936,273 | 5/1960 | Untermyer | 204—193.2-34 |
| 2,969,312 | 1/1961 | Monson | 204—193.2-34 |
| 3,031,388 | 4/1962 | Barchet | 240—193.2-34 |
| 3,137,638 | 6/1964 | Kumpf et al. | 176—78 |

LEON D. ROSDOL, *Primary Examiner.*

OSCAR R. VERTIZ, *Examiner.*

REUBEN EPSTEIN, CARL D. QUARFORTH, R. L. GRUDZIECKI, R. C. LYNE, *Assistant Examiners.*

---

UNITED STATES PATENT OFFICE
CERTIFICATE OF CORRECTION

Patent No. 3,261,758                      July 19, 1966

Pierre Edmond Jules Marie Maldague et al.

It is hereby certified that error appears in the above numbered patent requiring correction and that the said Letters Patent should read as corrected below.

In the drawings, sheet 2, FIG. 2, for reference numeral "2" read -- 12 --.

Signed and sealed this 22nd day of August 1967.

(SEAL)
Attest:

ERNEST W. SWIDER                      EDWARD J. BRENNER
Attesting Officer                     Commissioner of Patents

UNITED STATES PATENT OFFICE
CERTIFICATE OF CORRECTION

Patent No. 3,261,758                          July 19, 1966

Pierre Edmond Jules Marie Maldague et al.

It is hereby certified that error appears in the above numbered patent requiring correction and that the said Letters Patent should read as corrected below.

In the drawings, sheet 2, FIG. 2, for reference numeral "2" read -- 12 --.

Signed and sealed this 22nd day of August 1967.

(SEAL)
Attest:

ERNEST W. SWIDER                          EDWARD J. BRENNER
Attesting Officer                           Commissioner of Patents